US011652822B2

(12) United States Patent
Broda et al.

(10) Patent No.: US 11,652,822 B2
(45) Date of Patent: May 16, 2023

(54) DEPERIMETERIZED ACCESS CONTROL SERVICE

(71) Applicant: Amazon Technologies, Inc., Seattle, WA (US)

(72) Inventors: Maciej Broda, Ottawa (CA); Eric Jason Brandwine, Haymarket, VA (US); Matthew Schwartz, Fairfax Station, VA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 17/119,640

(22) Filed: Dec. 11, 2020

(65) Prior Publication Data

US 2022/0191209 A1 Jun. 16, 2022

(51) Int. Cl.
*H04L 9/40* (2022.01)
*H04L 67/141* (2022.01)

(52) U.S. Cl.
CPC ........ *H04L 63/102* (2013.01); *H04L 63/0218* (2013.01); *H04L 63/0807* (2013.01); *H04L 63/20* (2013.01); *H04L 67/141* (2013.01)

(58) Field of Classification Search
CPC ............. H04L 63/0218; H04L 63/0807; H04L 63/102; H04L 63/20; H04L 63/30; H04L 67/141; H04L 9/3213
See application file for complete search history.

(56) References Cited

U.S. PATENT DOCUMENTS

| 8,832,855 | B1 * | 9/2014 | Enderwick .......... G06F 21/6218 726/28 |
| 8,843,999 | B1 | 9/2014 | Vasquez et al. |
| 10,230,770 | B2 * | 3/2019 | Xu ........................ H04L 67/141 |
| 10,992,670 | B1 * | 4/2021 | Drooger .............. H04L 63/0428 |

(Continued)

FOREIGN PATENT DOCUMENTS

EP 2495658 A1 9/2012

OTHER PUBLICATIONS

Appgate. "Appgate SDP—Reference Architectures", Apr. 2020. (Year: 2020).*

(Continued)

*Primary Examiner* — Michael Simitoski
(74) *Attorney, Agent, or Firm* — Nicholson De Vos Webster & Elliott, LLP

(57) ABSTRACT

Techniques for deperimeterized access control are described. A method of deperimeterized access control may include receiving, by a controller of a deperimeterized access control service, a single packet authorization (SPA) request for a session ticket from an agent on a electronic device, wherein the agent sends the request for the session ticket in response to intercepting traffic destined for a service associated with the deperimeterized access control service and determining that the agent does not have a session ticket for the service, authorizing the SPA request, providing a session ticket to the agent based on the request, receiving, by a gateway of the deperimeterized access control service, a request to initiate a session with a service, the request (Continued)

including the session ticket, validating the session ticket, and providing session parameters to the agent to be used to initiate the session between the electronic device and the service.

20 Claims, 8 Drawing Sheets

(56) References Cited

U.S. PATENT DOCUMENTS

| | | | | |
|---|---|---|---|---|
| 11,271,777 | B2* | 3/2022 | Kim | H04L 12/4666 |
| 2012/0226813 | A1 | 9/2012 | Ragusa et al. | |
| 2017/0279792 | A1 | 9/2017 | Tse et al. | |
| 2017/0324733 | A1* | 11/2017 | Howry | G06F 21/577 |
| 2018/0241718 | A1* | 8/2018 | Stair | H04L 63/108 |
| 2018/0359255 | A1* | 12/2018 | Stair | G06F 21/31 |
| 2019/0207976 | A1* | 7/2019 | Yadav | H04L 63/1491 |
| 2019/0306251 | A1* | 10/2019 | Talebi Fard | H04W 76/10 |
| 2020/0127994 | A1* | 4/2020 | Kukreja | G06F 21/31 |
| 2020/0336484 | A1* | 10/2020 | Mahajan | H04L 61/4511 |
| 2021/0081632 | A1* | 3/2021 | Batchu | H04W 12/71 |
| 2021/0092094 | A1* | 3/2021 | Kim | H04L 63/08 |
| 2021/0092095 | A1* | 3/2021 | Kim | H04L 63/0209 |
| 2021/0105275 | A1* | 4/2021 | Bansal | H04L 67/1001 |
| 2021/0160237 | A1* | 5/2021 | Rozner | H04L 9/3213 |
| 2021/0185018 | A1* | 6/2021 | Soman | H04L 63/0407 |
| 2021/0367944 | A1* | 11/2021 | Gupta | H04L 67/56 |
| 2022/0014553 | A1* | 1/2022 | Dutta | H04L 69/322 |
| 2022/0045854 | A1* | 2/2022 | Bareket | H04L 9/0894 |
| 2022/0116421 | A1* | 4/2022 | Yadav | H04L 63/1491 |

OTHER PUBLICATIONS

Cyxtera. "Definitive Guide to Software-Defined Perimeter, An identity-centric, zero-trust approach", Sep. 2018. (Year: 2018).*

Kumar, Palash, et al. "Performance analysis of sdp for secure internal enterprises." 2019 IEEE Wireless Communications and Networking Conference (WCNC). IEEE, 2019. (Year: 2019).*

D. Puthal, S. P. Mohanty, P. Nanda and U. Choppali, "Building Security Perimeters to Protect Network Systems Against Cyber Threats [Future Directions]," in IEEE Consumer Electronics Magazine, vol. 6, No. 4, pp. 24-27, Oct. 2017, doi: 10.1109/MCE.2017.2714744. (Year: 2017).*

Xie, Xinmeng, Gang Gan, and Yong Chen. "Research on SDP Software Defined Perimeter Initiating Host Protocol Configuration Algorithm." IOP Conference Series: Earth and Environmental Science. vol. 428. No. 1. IOP Publishing, Jan. 2020. (Year: 2020).*

International Search Report and Written Opinion, PCT App. No. PCT/US2021/062695, dated Mar. 22, 2022, 11 pages.

* cited by examiner

DEPERIMETERIZED ACCESS CONTROL SERVICE

BACKGROUND

Virtual private networks (VPNs) are commonly used to provide users with access to their organization's network when offsite. However, VPN access has several shortcomings that affect their scalability, performance, and network security. For example, VPNs tunnel all client traffic through the enterprise including high traffic, but secure, operating system built-in services, which reduces scalability and does not add much security. Additionally, VPNs provide full access to the enterprise network including network connectivity to potentially vulnerable services that the user does not need to access, but that offer attractive targets to an attacker. Further, VPNs do not offer flexibility in preserving performance and privacy of user apps that do not need to be tunneled through the enterprise network. VPNs also mask real-time services such as voice and video communication within the tunnel preventing Quality of Service (QoS) prioritization end-to-end. Alternatively, directly exposing services to the Internet causes another set of issues. For example, the service stack is exposed to scanning by random parties and fingerprinting the service to identify vulnerable components. Additionally, because service ports are always open it is much easier for the attackers to target and execute a successful DDoS attack. The volume of illegitimate traffic handled by the directly exposed services creates noise that hides the actions of resourceful and determined adversaries that are actively working on penetrating organizations' open attack surface.

BRIEF DESCRIPTION OF DRAWINGS

Various embodiments in accordance with the present disclosure will be described with reference to the drawings, in which.

DETAILED DESCRIPTION

Figure 1:
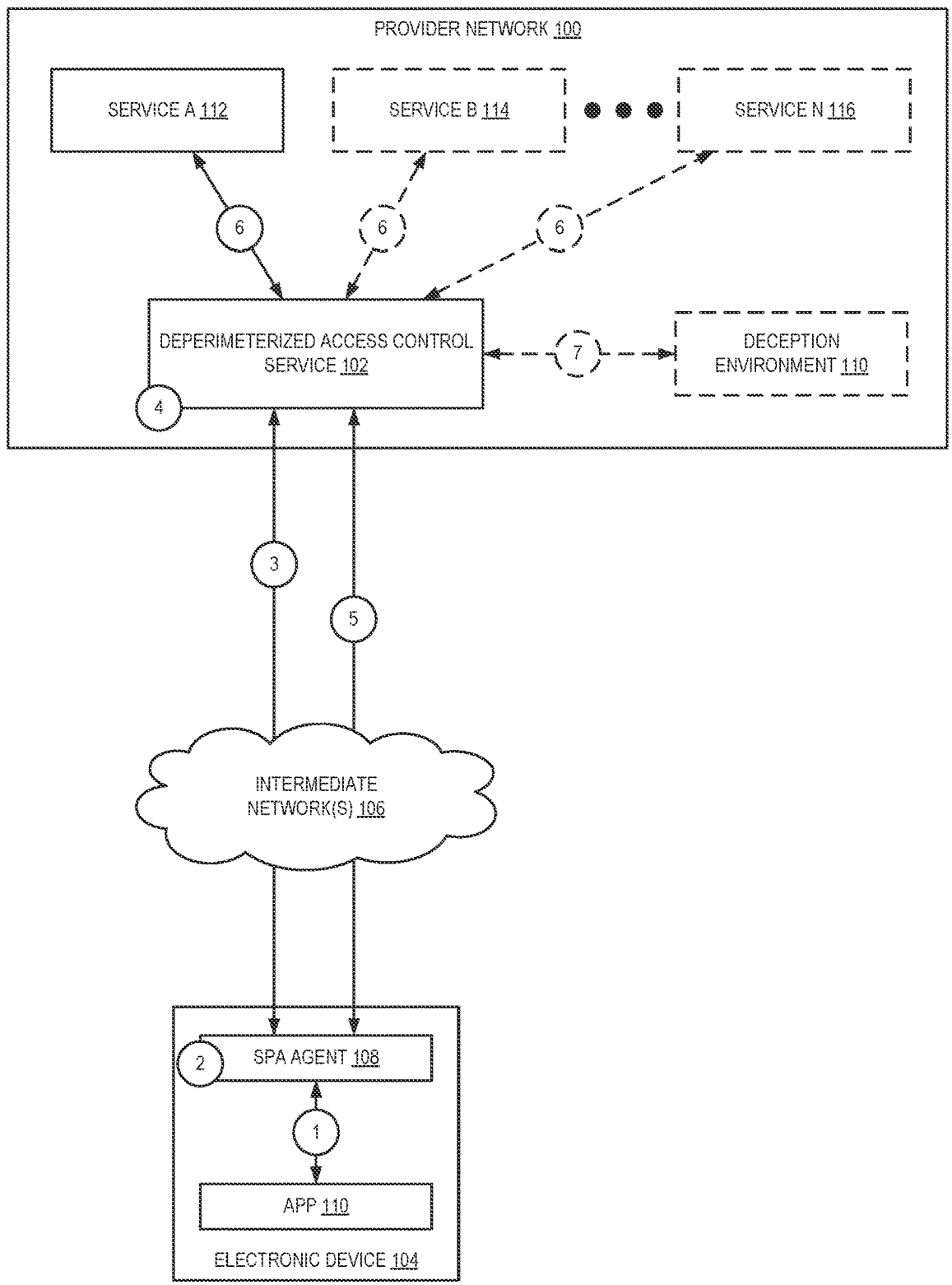
FIG. 1 is a diagram illustrating an environment for deperimeterized access control according to some embodiments.

The present disclosure relates to methods, apparatus, systems, and non-transitory computer-readable storage media for deperimeterized access control. As the numbers of mobile workers increase and supply chains become more complex, with large numbers of contract and partner employees accessing organizations' information infrastructure, scalable and secure means of connecting these users to core enterprise IT services become more important. According to some embodiments, a deperimeterized access control service enables an enterprise to expose restricted services to authorized users outside of the enterprise perimeter while keeping the services invisible to, and protected from, unauthorized connections. This allows organizations to simplify their IT architecture and operations by exposing their internal network services to enable direct access from the Internet. Embodiments address the problems of directly exposing services to the Internet using a client authorization layer that leverages Single Packet Authorization (SPA). SPA enables an authorized client device to access the service directly while ignoring network traffic from unauthorized sources. In some embodiments, the service can be configured to establish a secure tunnel between the client device and a gateway providing session encryption. A. Using SPA, a single packet can authenticate a user to a system. Furthermore, it is a protocol for allowing a remote user device to authenticate securely on a closed system (e.g., a system having limited or no open services) and make changes to, or run applications on, the closed system.

Embodiments use a lightweight SPA agent provisioned to a user's device to authenticate the user's device and facilitate communication with the enterprise's services. During enrollment, the SPA agent is provisioned with unique cryptographic credentials that it presents to an SPA controller services in a lightweight request. In some embodiments, the request is a unidirectional communication, such as a single UDP packet. This way, the deperimeterized access control service can remain invisible to unauthorized actors. Alternatively, in some embodiments, SPA can be performed as part of the TLS handshake. In such embodiments, the request is still unidirectional, and implementing SPA as part of the TLS handshake effectively prevents fingerprinting the server and/or services, however this does allow for its discovery through the TCP 3-way handshake. The SPA controller authenticates the client and, if successful, enables access to enterprise services allowed by policy and informed by the client security posture and context. The posture and/or context information can be obtained by the SPA agent from the electronic device. The posture and/or context information can include device physical location (e.g., the services may only be accessed when the user device is located in one or more particular physical locations), connected wireless devices (e.g. determine whether other devices are connected to the user device via Bluetooth or other wireless connections, determine whether wireless connections are enabled, etc.), device/user biometrics, etc. For instance, a user accessing the enterprise services from a WiFi hotspot with a vulnerable device (e.g., unpatched, or otherwise lacking up-to-date software) would be allowed to access the IT support help desk and basic troubleshooting information. Once the device has been updated and is no longer vulnerable and/or is no longer connecting from an unsecure location, the device would be allowed access to more sensitive information. Embodiments additionally provide additional defense against distributed denial of service (DDoS) attacks. Only verified users can communicate with the system, leaving it invisible to port scans and taking no additional resources to shed attack traffic. Accordingly, embodiments provide secure and scalable access to enterprise services that overcome the deficiencies of prior techniques described above.

FIG. 1 is a diagram illustrating an environment for deperimeterized access control according to some embodiments. As shown in FIG. 1, a provider network 100 can include a plurality of services 112-116. These services may include various services provided by an enterprise to its users, employees, customers, contractors, etc. These services are hosted on the open Internet. As such, a VPN is not required to access these services. Instead, the provider network 100 can provide access to these services to authorized users or other entities and hide these services from unauthorized entities. Embodiments are described with respect to implementing deperimeterized access control service 102 in a provider network environment. However, in some embodiments, the described techniques may, in whole or in part, be implemented in other computing environments to reduce security complexity while protecting services, computing systems, etc. from unauthorized access. For example, the SPA techniques described herein may be implemented by a wireless access point. A mesh access points can implement the SPA techniques described herein in a heavily congested Wi-Fi area to ignore unauthorized packets, thereby preventing DDoS on the RF spectrum used by the access points.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, a user can install SPA agent 108 to facilitate communication from the user's electronic device 104 to one or more services of provider network 100. The SPA agent can then reach out to an enterprise endpoint (e.g., a URL or other endpoint exposed by provider network 100 or another location on the Internet, an enterprise intranet, or other network). The user then provides their credential(s) (e.g., username and password, biometric data, and/or other identifying information), and the enterprise configures the SPA agent 108 to access particular services. In some embodiments, configuring the SPA agent 108 includes providing a credential to the SPA agent 108 by the enterprise which is used to perform SPA by deperimeterized access control service 102.

An application 110 on electronic device 104 (e.g., a user device, internet of things (IoT) device, or other computing device) can access the services provided by provider network 100 via the lightweight SPA agent 108. For example, the application can attempt to initiate a session with a service (e.g., check email, request a document, etc.). In some embodiments, this may be performed in response to user input (e.g., a user accessing the application on their user device), or may not involve any user involvement. For example, where the electronic device is an IoT device, the application running on the IoT device may attempt to connect to a service automatically to relay sensor data collected by one or more sensors of the IoT device. At numeral 1, the SPA agent can intercept traffic from the electronic device 104, including traffic from application 110. The SPA agent determines whether that traffic is associated with one of the services whose access is managed by deperimeterized access control service 102, at numeral 2. If the traffic is not associated with one of the services, then the traffic passes through to its destination. If the traffic is associated with one of the services, then it is held by the SPA agent 108 until the user device has been authorized using SPA, if not already authorized. In some embodiments, the SPA agent 108 is provisioned with unique cryptographic credentials that it presents to the deperimeterized access control service 102 in a lightweight request at numeral 3. For example, the SPA agent provides access credentials and posture data to an SPA controller of the deperimeterized access control service 102 using an authorization payload. In some embodiments, the authorization payload includes a unidirectional UDP packet (or other single packet). Alternatively, in some embodiments, a TLS handshake (e.g., multiple packets involved in TCP 3-way handshake) may precede the unidirectional packet as part of the authorization payload.

The deperimeterized access control service 102 authenticates the electronic device 104 (e.g., the requesting client device) and, if successful, enables access to enterprise services allowed by policy and informed by the client security posture and context at numeral 4. In various embodiments, a policy can identify time restrictions, originating network/IP restrictions, specific authorized services, etc. For instance, a user accessing the enterprise services from an WiFi hotspot with an unpatched device may be allowed to access a limited number of services, such as the IT support help desk and basic troubleshooting information, but may be allowed access to more sensitive information once in a secure location with any/all critical patches applied. Other posture claims that may be verified prior to allowing access may include, but are not limited to, device physical location (e.g., the services may only be accessed when the user device is located in one or more particular physical locations), connected wireless devices (e.g. determine whether other devices are connected to the user device via Bluetooth or other wireless connections, determine whether wireless connections are enabled, etc.), device/user biometrics, etc. In some embodiments, the deperimeterized access control service 102 can return a session ticket to the SPA agent 108 based on the authentication and security policy associated with the user. The session ticket can indicate which services the user is authorized to access. In some embodiments, the deperimeterized access control service 102 only acknowledges the SPA request if it is properly authenticated; otherwise the request is silently dropped.

At numeral 5, the SPA agent can attempt to connect to a requested service using the session ticket. The deperimeterized access control service 102 can then validate the ticket and provide session parameters that enable the SPA agent 108 to open a connection to the requested service. For example, at numeral 6, a connection can be opened to the requested service, such as service A 112 or one of the other services (e.g., service B 110 to service N 112). Once the connection is opened, then the traffic that was previously held by the SPA agent 108 is passed through the open connection to the service. In some embodiments, if the session ticket does not provide access to the requested service, then the traffic is ignored. In some embodiments, if no session ticket is included with the request, then the deperimeterized access control service 102 may ignore the traffic entirely or redirect the traffic to a deception environment 110, at numeral 7.

Figure 2:
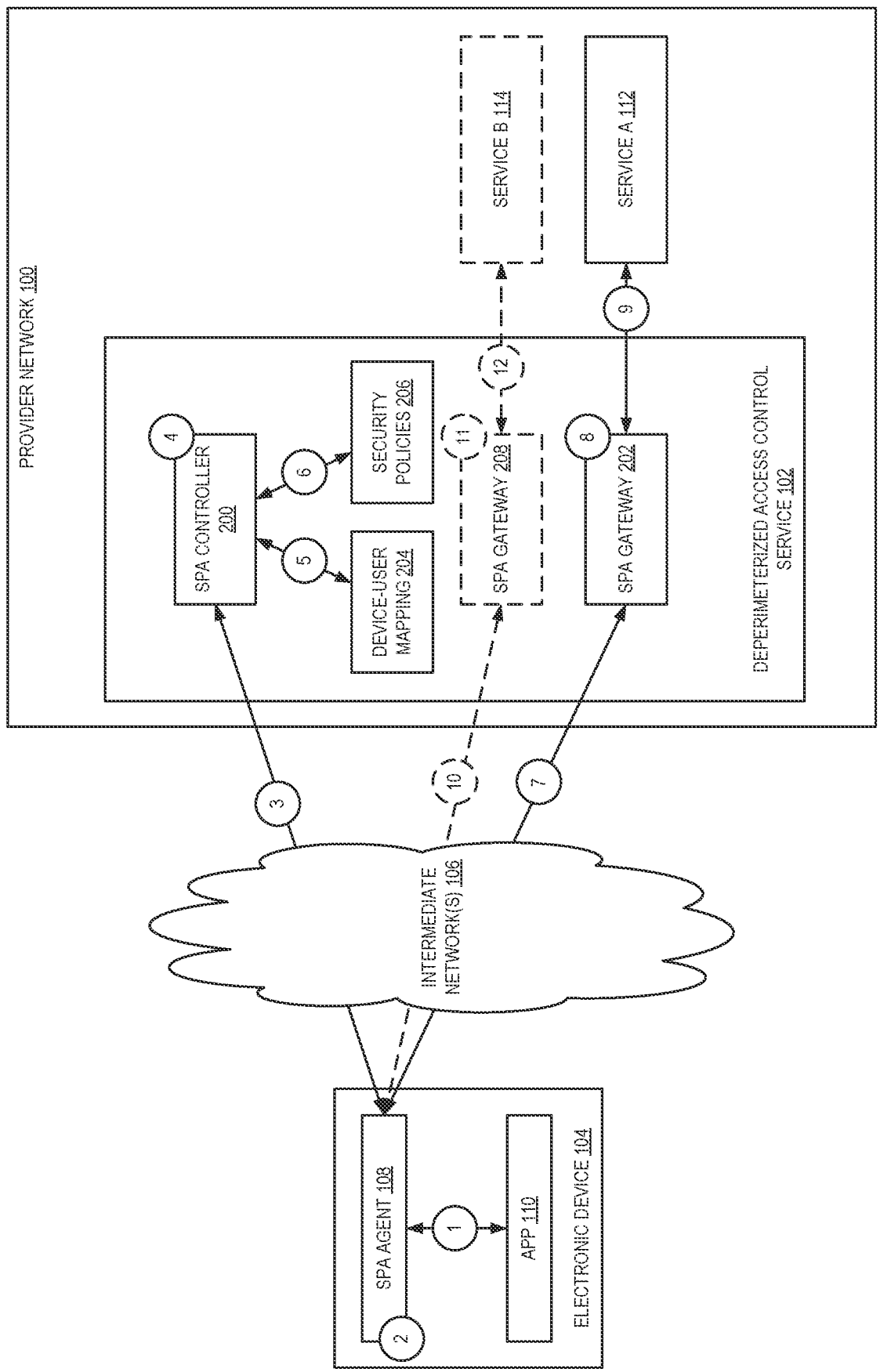
FIG. 2 is a diagram illustrating an environment for deperimeterized access control according to some embodiments.

FIG. 2 is a diagram illustrating an environment for deperimeterized access control according to some embodiments. As shown in FIG. 2, in some embodiments, the SPA agent 108 intercepts traffic from electronic device 104, such as traffic from application 110 at numeral 1. The SPA agent 108 can determine whether the traffic is a request to a service that is managed by deperimeterized access control service 102 based on characteristics of the traffic (e.g., destination address, etc.), at numeral 2. In some embodiments, if the requested service is managed by deperimeterized access control service 102, the SPA agent can also determine whether it has a session ticket associated with that service. If it does, then it can connect to the service via gateway 202. However, if it does not have a session ticket, then at numeral 3 it can send a request for a session ticket to SPA controller 200. The request can include a credential which was provisioned to the SPA agent 108 at setup. The SPA controller 200 validates the credential at numeral 4 and then determines a user associated with the device, at numeral 5, using a device to user mapping 204. The device to user mapping 204 can map an identifier associated with the electronic device 104, which may be included as part of the credential that is provided at numeral 3, to a user (e.g., an enterprise employee, contractor, or other person authorized to access one or more of an enterprise's services).

At numeral 6, the SPA controller 200 can then look up a security policy 206 associated with the user. The security policy 206 may define the services that the user can access as well as user device posture claims that must be satisfied to access some or all of these services. For example, the user device posture claims may include the type of network (e.g., public or private) through which the user device is accessing the services, the current state of software on the user device (e.g., is the operating system and/or client application up to date with the latest security patches), etc. The SPA controller then provisions a session ticket to the SPA agent 108 indicating the services the user can access. In some embodiments, the policy associated with the user may restrict their access to services. For example, if the user is recently terminated, their access to services may be disabled, or may be reduced to one or more services through which they can return their electronic device(s). This way, the services which the user may access can be updated dynamically, even though the credential provisioned to the SPA agent is still valid. Additionally, in some embodiments, the policy may enable different access depending on the type of electronic device the user is using. For example, the user's personal device may have access to a first set of services, while their enterprise-issued device has access to a second set of services, based on device characteristics (e.g., device encryption, device security, etc.).

At numeral 7, the SPA agent 108 then opens a connection to the requested service by sending a packet to the gateway along with the session ticket. In some embodiments, different services may be associated with different gateways. Additionally, or alternatively, multiple services may be associated with the same gateway. At numeral 8, the SPA gateway validates the ticket. If the session is legitimate the SPA Gateway 202 optionally negotiates session port rewriting pair for the SPA agent 108 and itself, and establishes one or more session-specific rules between the SPA agent 108 the service 112 at numeral 9. The SPA agent 108 can then pass the traffic that was initially held while the connection was being established to the service over the newly established connection.

In some embodiments, deperimeterized access control service 102 may implement a plurality of gateways and access to the same service or a different service. In some embodiments, the different gateways may support different communication protocols. When attempting to connect to a given service, the SPA agent can failover across gateways. For example, if at numeral 7, the SPA agent is unable to connect to SPA gateway 202 using a UDP packet, the SPA agent 108 can then failover to SPA gateway 208 and attempt to connect via TCP at numeral 10. A TLS handshake is attempted with the SPA gateway 208 at numeral 11. If the SPA agent is authenticated during the TLS handshake, then the session parameters can be provided to the SPA agent to open a connection to service at numeral 12. If the SPA agent is not authenticated successfully, then the traffic can be dropped. This way the communication is still unidirectional (e.g., a response is not returned to the SPA agent). However, this does expose the SPA gateway 208 as existing and communicating over TCP. As such, it may be more susceptible to some attacks. By separating out SPA gateway 202, any services accessible to SPA gateway 202 are protected from an attack on SPA gateway 208.

Figure 3:
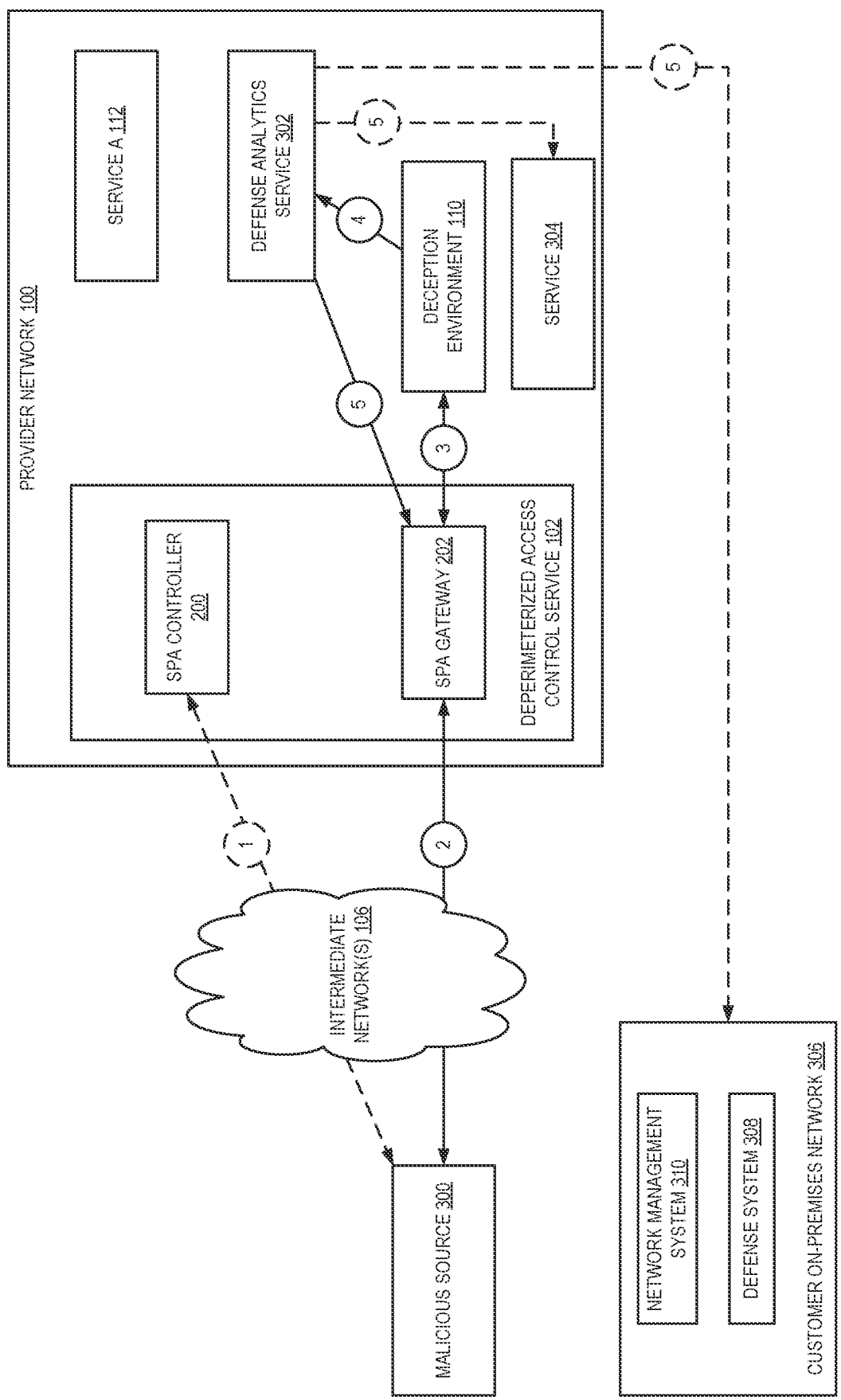
FIG. 3 is a diagram illustrating an environment for deperimeterized access control with a deception environment according to some embodiments.

FIG. 3 is a diagram illustrating an environment for deperimeterized access control with a deception environment according to some embodiments. As shown in FIG. 1, in some embodiments, a malicious source 300 may attempt to connect to SPA controller 200 to obtain a ticket to access services provided by provider network 100 at numeral 1. The SPA controller can determine it has received an invalid request (e.g., due to client not being provisioned or not using the right authorization credentials) and provides the client (e.g., malicious source 300) with a ticket that will trigger redirection into deception environment at the SPA Gateway 202 at numeral 2. Additionally, or alternatively, in some embodiments, if a malicious source 300 attempts to access a service directly, at numeral 2, without first being authenticated by the SPA controller 200, the SPA gateway 202 can redirect to a deception environment 110 or ignore the traffic. Traditional deception environments have their own IP address separate from the target service. However, using SPA the deception environment 110 and the target service (e.g., service A 112) both have the same IP address. As such, the deperimeterized access control service 102 determines whether traffic received at the IP address is routed to the target service or the deception environment 110.

As discussed, at numeral 2, traffic is received from a malicious source that has not been properly authenticated. The SPA Gateway 202 validates whether the device/user policy for this session is allowed. If this is not the case or the SPA Gateway receives unannounced traffic at any service port it has the option of directing the session in the deception environment 110 based on its policy configuration and any proactive blocking that has been implemented. In some embodiments, the SPA gateway 202 can choose to drop the traffic or route the traffic to deception environment 110. By dropping the traffic, the risks associated with DDoS attacks is reduced since any unauthorized traffic is just ignored. Alternatively, the traffic received from a malicious source can be rerouted to the deception environment at numeral 3, all while appearing to access the same IP address. This way the deperimeterized access control service 102 separates the authorized users from unauthorized users all while the service is exposed to the Internet, or other public network, and without any VPN service.

Organized adversaries pragmatically target systems that allow them to maximize their profit. Making initial reconnaissance more difficult (e.g., by ignoring the traffic or routing the traffic to a deception environment) is likely to make the target much less attractive at an early stage in the kill chain. Additionally, deception capability provides improved situational awareness through early detection capability for adversaries looking for targets or perhaps actively attempting penetration. It allows for automated mapping of adversary infrastructure and some insight into the adversary tactics, techniques, and procedures (TTPs). Additionally, in some embodiments, while in the deception environment 110 the malicious source can be fingerprinted and/or attribution data can be collected. For example, web hooks can be used to collect client browser data or modify requested data with web-bugs (i.e. request for a document). This allows for tied responses for threat actor profiling (TAP). TAP is a cost effect early warning system that models an actor's behavior and inputs to build a cyber persona.

In some embodiments, the deception environment 110 can collect intelligence on actors, tactics, techniques, and procedures which can be provided to defense analytics service 302. Defense analytics service 302 can collect this intelligence from across multiple customer applications that are hosted in provider network 100 and uses this intelligence to improve protections for multiple customers. For example, at numeral 5, the SPA gateway 202 can be updated based on the intelligence. This may include identifying specific actors (e.g., by IP address, fingerprint, etc.) whose traffic should always be ignored. For example, defense analytics service 302 can use the gathered intelligence (e.g., through automated rules and/or explicit analyst actions) to generate threatlisting and/or protection rules that are applied back to the Gateway. This way the gateway can make fast, low-resource decisions on known malicious traffic while enabling further study of new/unknown threats. In some embodiments, in addition to updating SPA gateway 202 based on the gathered intelligence, optionally other service(s) 304 of provider network 100 and/or customer network(s) 306 may similarly be updated. For example, service(s) 304 may include a DDoS service, firewall service, or other defense service offered by provider network 100. Service(s) 304 can update their own defenses (e.g., via threatlisting, protection rules, etc.) using the intelligence gathered by defense analytics service 302 based on the deception environment 110. Additionally, or alternatively, provider network 100 can use the gathered intelligence to change the network or application posture (e.g., update routes, increase logging levels, etc.), and/or to update the deception environment with additional stimuli to collect additional intelligence. Likewise, a customer network may include a defense system 308, such as a firewall or other system, which can be similarly updated based on the gathered intelligence. Similarly, a customer network 306 can also update their network management system 310 based on the gathered intelligence (e.g., update routes, increase logging levels, etc.).

Figure 4:
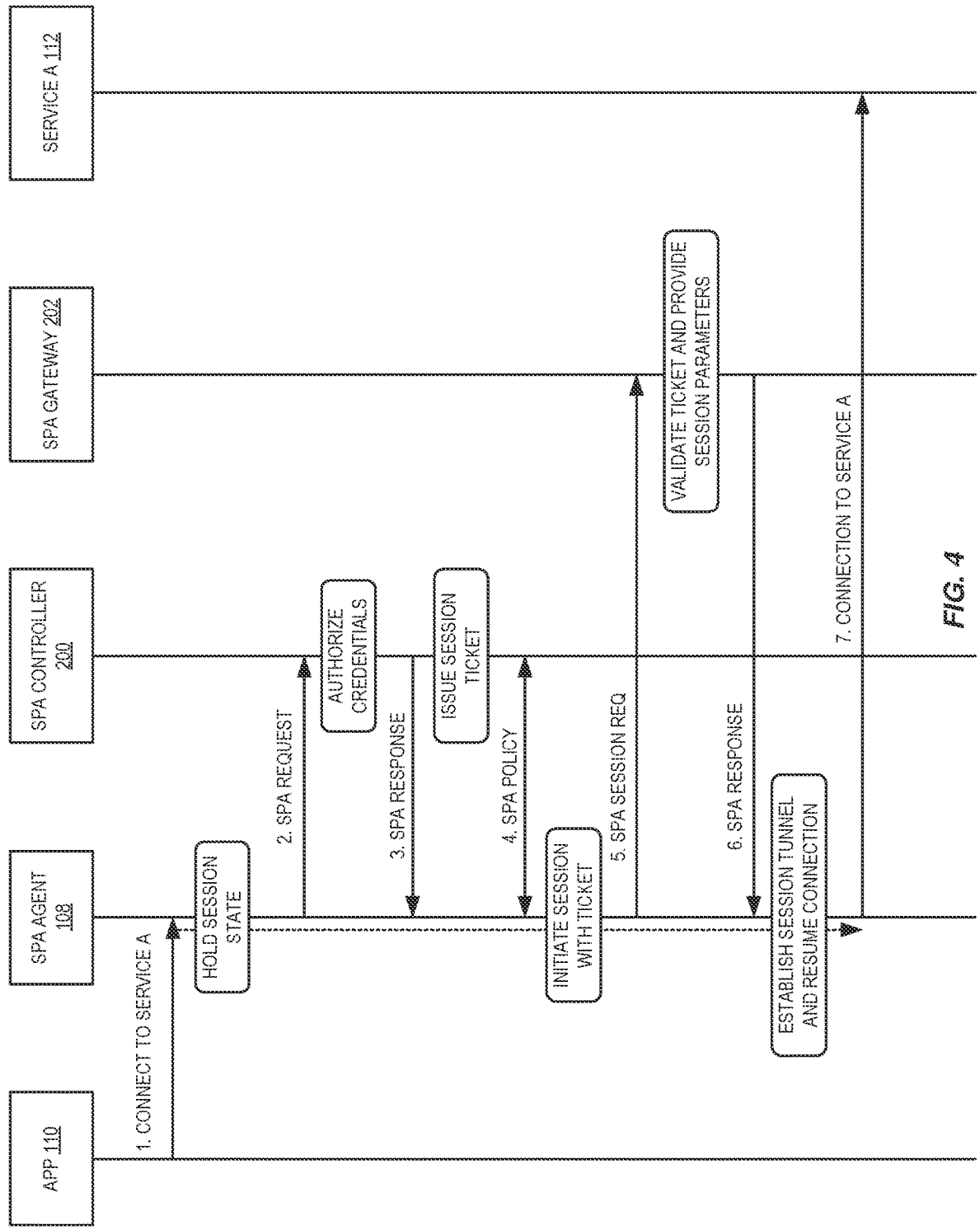
FIG. 4 is a diagram illustrating a dataflow diagram of deperimeterized access control according to some embodiments.

FIG. 4 is a diagram illustrating a dataflow diagram of deperimeterized access control according to some embodiments. At numeral 1, an application attempts to connect to a service in provider network 100 (such as service A 112). The request is intercepted by SPA agent 108 executing on the user's device which holds the session state while authentication is performed. For example, at numeral 2, the SPA agent 108 sends an SPA request to SPA controller 200. As discussed, the request can include a single packet (e.g., a UDP packet or other packet) that includes client credentials (e.g., a device identifier or other secure credentials that were provisioned when the SPA agent was set up on the user's device) to authenticate to the server.

The SPA controller 108 receives the request and does one of several actions. For example, the SPA controller 108 can validates the request and return an SPA response at numeral 3 that includes a service ticket. As discussed, the SPA controller 108 may determine it is an invalid request (e.g., due to client not being provisioned, not using the right authorization credentials, etc.) and provides the client with a ticket that will trigger redirection into deception environment at the SPA Gateway 202. Alternatively, the SPA controller 108 may determines it is an invalid request as above and silently ignore it.

Assuming the client has been issued a valid ticket, then at numeral 4, it can use the ticket to initiate a TLS protected session with the SPA Controller 200 to submit its posture information and retrieve a policy along with a directory of allowed services it is authorized to reach. At this point the user device, via SPA agent 108, is ready to initiate service requests. The SPA agent 108 in the user device identifies traffic initiated to services protected with deperimeterized access control service 102. When such a service is requested, at numeral 5, a SPA Session request to the SPA gateway 202 along with the service ticket obtained from SPA Controller 200. The SPA gateway 202 validates that the device/user policy for this session is allowed. As discussed, if the session is not allowed because it cannot be validated, or the SPA gateway receives unannounced traffic at any service port, it has the option of directing the session in a deception environment based on its policy configuration and any proactive blocking that has been implemented. Alternatively, the SPA gateway can simply ignore any traffic that cannot be validated. If the session is successfully validated, then the SPA gateway optionally negotiates session port rewriting pair for the SPA agent and itself and establishes session-specific rule between the SPA Client the service. These session parameters can be provided in an SPA response at numeral 6. The SPA agent 108 can then establish a session tunnel using these session parameters with the requested service, at numeral 7, and provide the traffic received at numeral 1 that had been previously held by the SPA agent.

Figure 5:
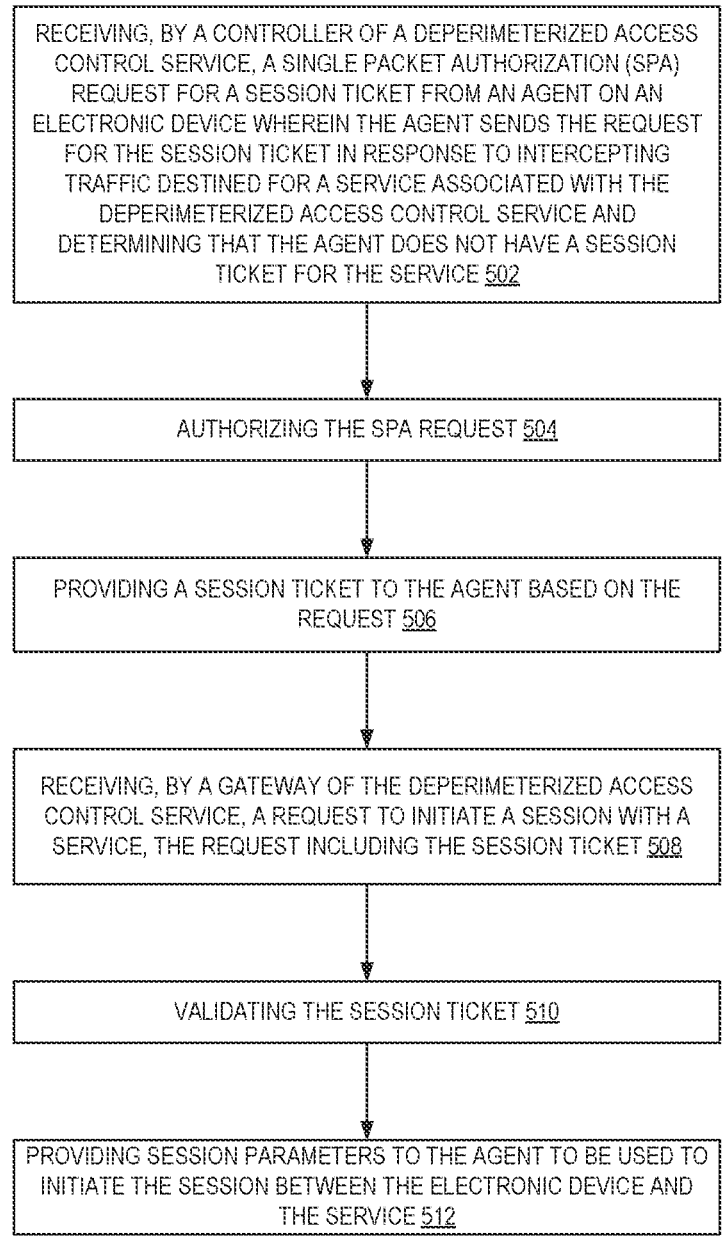
FIG. 5 is a flow diagram illustrating operations of a method for deperimeterized access control according to some embodiments.

FIG. 5 is a flow diagram illustrating operations 500 of a method for deperimeterized access control according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by SPA agent 108 and/or the deperimeterized access control service 102 of the other figures.

The operations 500 include, at block 502, receiving, by a controller of a deperimeterized access control service, a single packet authorization (SPA) request for a session ticket from an agent on an electronic device, wherein the agent sends the request for the session ticket in response to intercepting traffic destined for a service associated with the deperimeterized access control service and determining that the agent does not have a session ticket for the service. In some embodiments, the agent on the client device is configured to intercept traffic from an application on the client device by an agent on the client device, the traffic associated with the service, determine the service is associated with the deperimeterized access control service, and determine that the agent does not have the session ticket for the service. In some embodiments, the agent is further configured to obtain posture information for the electronic device, the posture information including one or more of a software version associated with the client device, network security information associated with the client device, device physical location, connected wireless devices, or user biometrics, and provide the posture information to the controller. In some embodiments, the agent holds the traffic and provides the traffic to the service once the session has been initiated. In some embodiments, the SPA request includes an authorization payload and a credential previously provisioned to the agent. In some embodiments, the SPA request is unidirectional.

The operations 500 further include, at block 504, authorizing the SPA request. For example, the controller can authorize the credential included with the SPA request. The controller can identify one or more policies associated with the client device to which the credential has been provisioned. These policies may define the services which the user associated with the device can access and one or more conditions under which the services may be accessed. For example, the device may have access to different services depending on the posture of the device. For instance, a device connected to a public network, or lacking current software security updates (e.g., patches) may have access to a limited number of services, whereas an up-to-date device connected from a private network may have access to more services. In some embodiment, authorizing the SPA request further includes mapping a user to the electronic device, determining a policy associated with the user, and generating the session ticket based on the policy The operations 500 further include, at block 506, providing a session ticket to the agent based on the request. In some embodiments, the session ticket may be based on one or more policies associated with the user or client device and the posture of the client device. The session ticket may identify the services which the user or device is authorized to access. In some embodiments, the session ticket may include one or more restrictions, such as a time limit for accessing the services. In various embodiments, the controller may monitor the device and change or revoke the session ticket if, for example, the security posture of the device changes.

The operations 500 further include, at block 508, receiving, by a gateway of the deperimeterized access control service, a request to initiate a session with a service, the request including the session ticket. The operations 500 further include, at block 510, validating the session ticket. For example, the gateway can confirm that the session ticket is valid (not expired, associated with the requesting device, issued by an authorized controller, etc.) and that it grants access to the requested service.

The operations 500 further include, at block 512, providing session parameters to the agent to be used to initiate the session between the client device and the service. In some embodiments, once the session has been initiated, the agent on the client device is further configured to provide the traffic to the service once the session has been initiated.

In some embodiments, the operations further include provisioning a credential to the agent which identifies the client device. For example, during setup, the agent can be downloaded to the client device by a user who can then connect to the enterprise to provision the credential to the agent.

In some embodiments, if a request is received by the deperimeterized access control service that is not authorized, then the deperimeterized access control service can drop the traffic or divert it to a deception environment. For example, in some embodiments, the operations further include receiving, by the gateway of the deperimeterized access control service, a second request to initiate a session with a service, the request not including the session ticket, and ignoring the second request. Alternatively, in some embodiments, the operations further include receiving, by the gateway of the deperimeterized access control service, a second request to initiate a session with a service, the request not including the session ticket, and routing the second request to a deception environment having a same IP address as the service. In some embodiments, the operations further include identifying a malicious actor based on one or more actions performed in the deception environment, and updating the gateway to perform one or more defensive actions on future traffic received from the malicious actor.

In some embodiments, the operations include intercepting, by a single packet authorization (SPA) agent on a client device, traffic destined for a service of a provider network from an application on the client device, determining that the service is associated with a deperimeterized access control service, sending an SPA request to a controller of the deperimeterized access control service, the SPA request including a device credential, obtaining a session ticket from the deperimeterized access control service, the session ticket based on a policy associated with the client device, sending a request to a gateway of the deperimeterized access control service to initiate a session with the service, receiving session parameters from the gateway, initiating a session with the service using the session parameters, and providing the traffic destined for the service over the session.

In some embodiments, the gateway validates the session ticket and determines the session ticket is associated with the service. In some embodiments, the session ticket is further based on posture information, the posture information including one or more of a software version associated with the client device. network security information associated with the client device, device physical location, connected wireless devices, or user biometrics.

Figure 6:
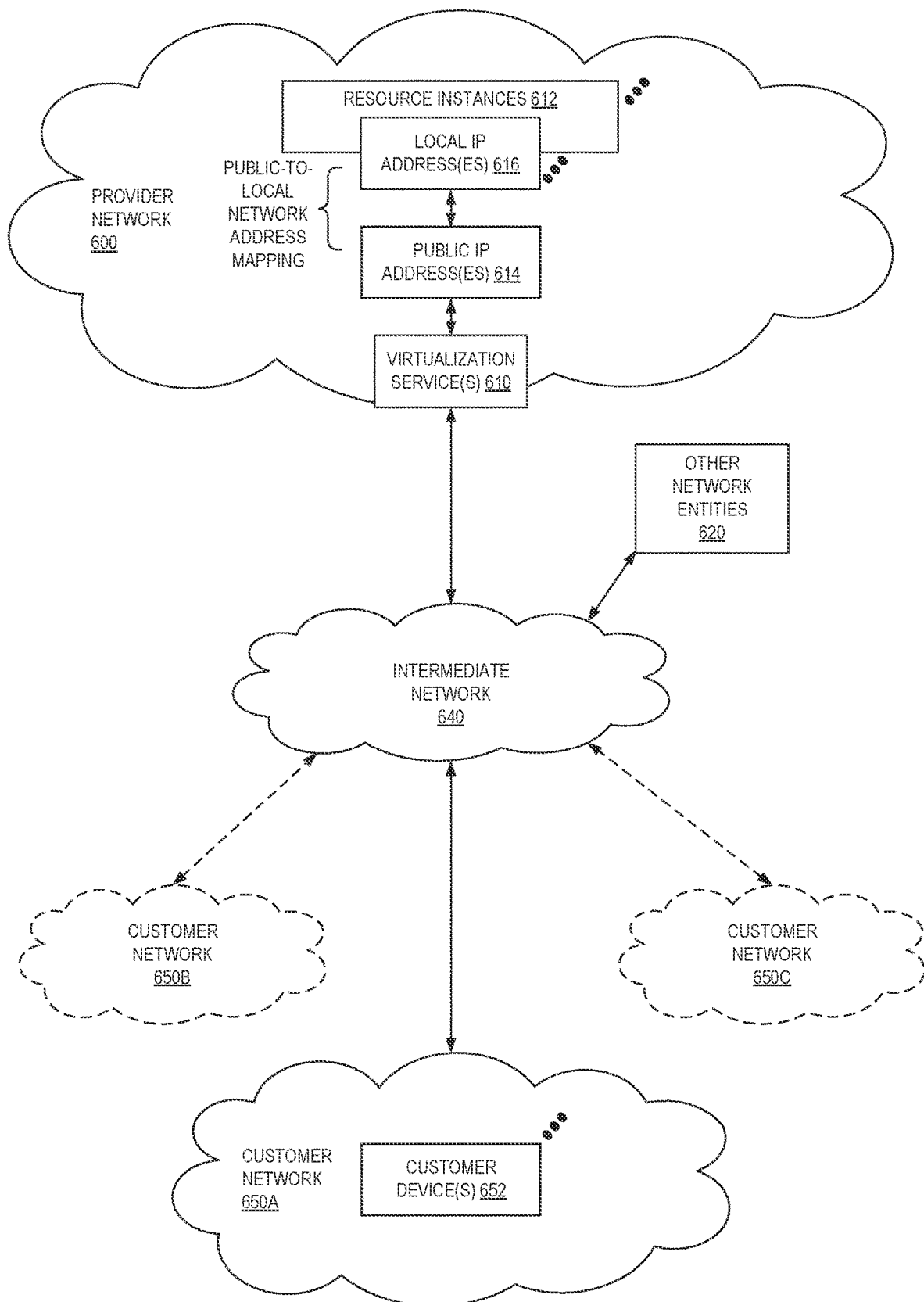
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
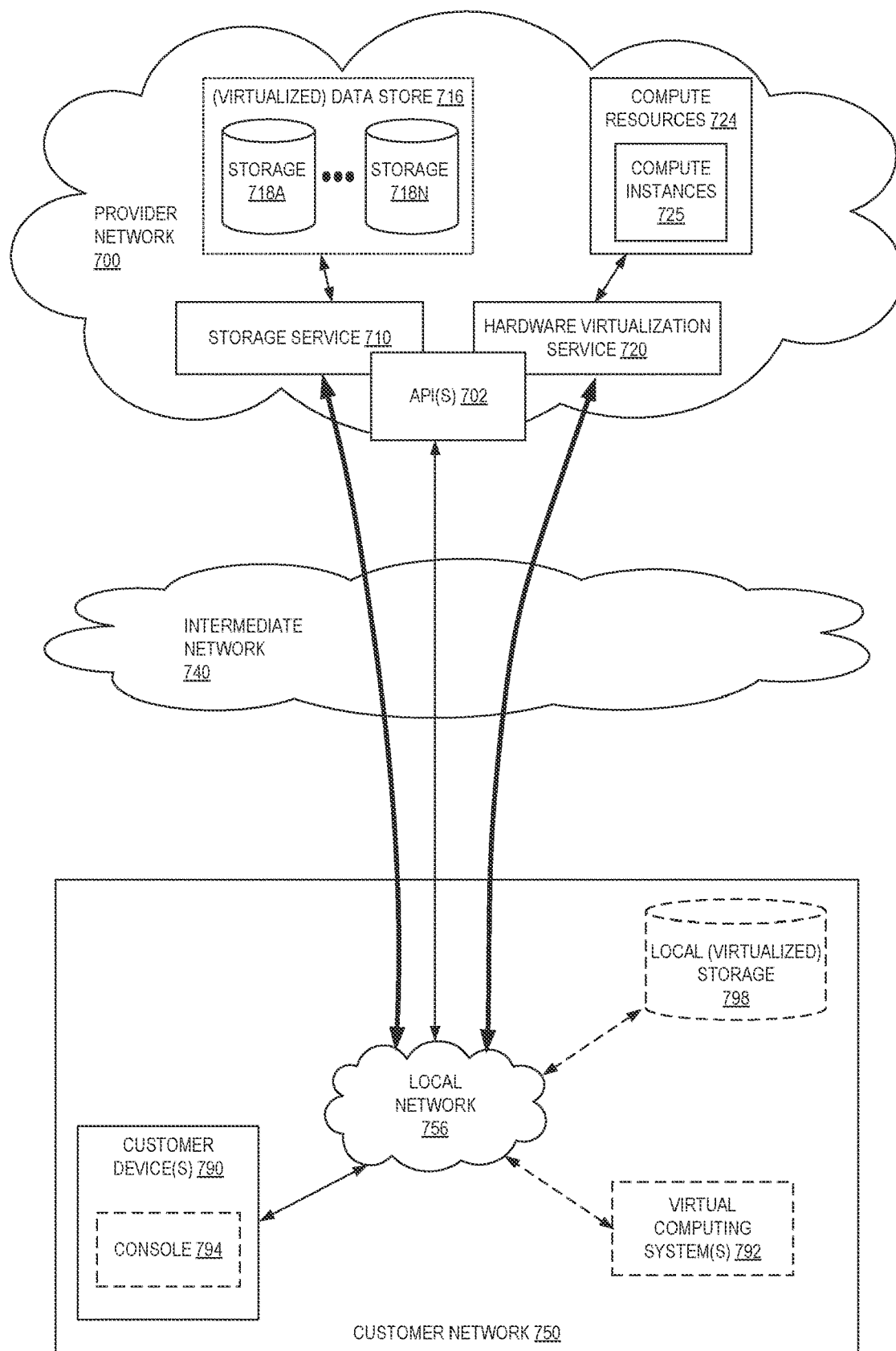
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
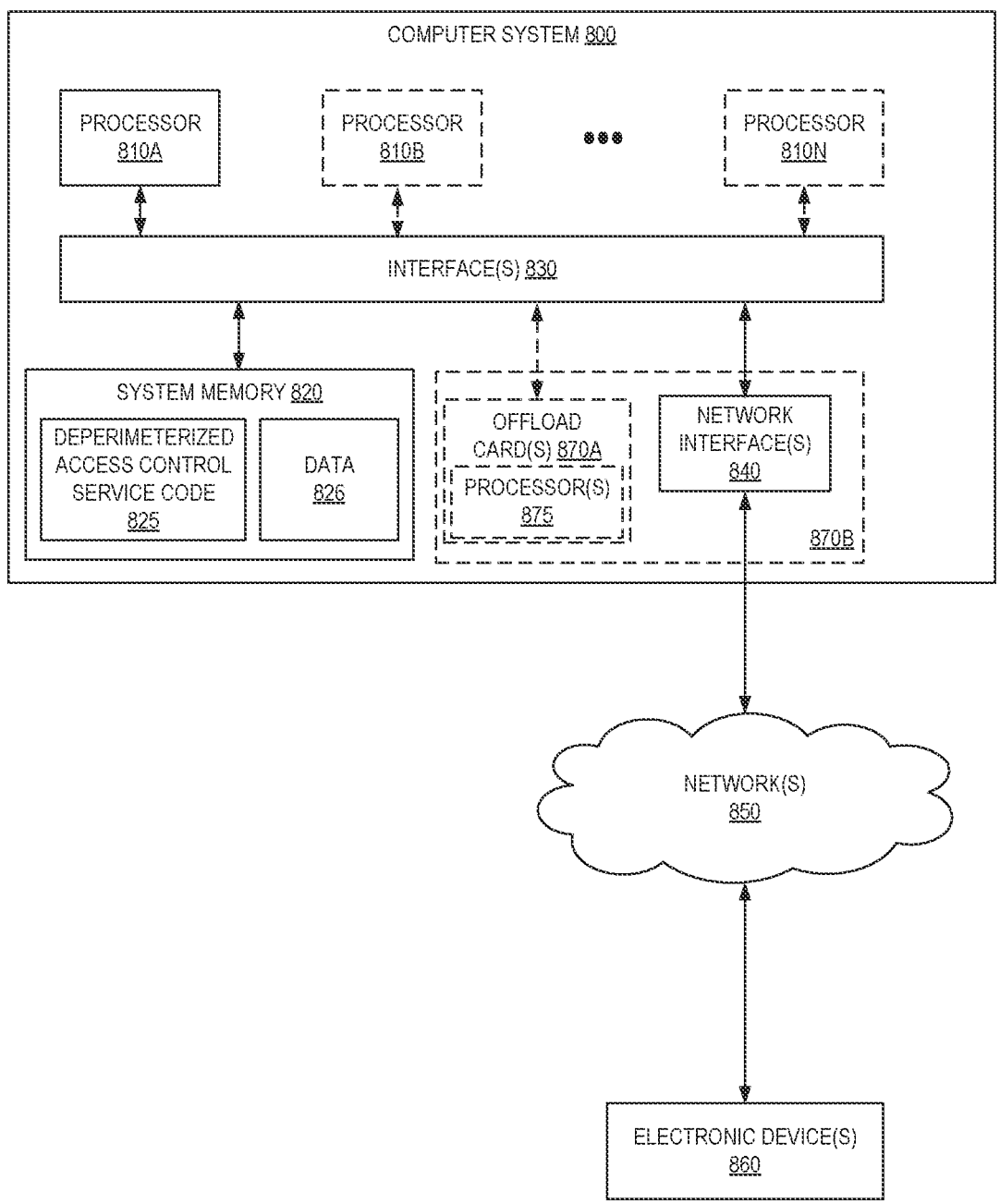
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as deperimeterized access control service code 825 (e.g., executable to implement, in whole or in part, the deperimeterized access control service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, by a controller of a deperimeterized access control service, a single packet authorization (SPA) request for a session ticket from an agent on an electronic device, wherein the agent sends the request for the session ticket in response to intercepting traffic destined for a service associated with the deperimeterized access control service and determining that the agent does not have a session ticket for the service, wherein the agent on the electronic device is further configured to:
  obtain posture information for the electronic device, the posture information including one or more of a software version associated with the electronic device, network security information associated with the electronic device, device physical location, connected wireless devices, or user biometrics;
  provide the posture information to the controller;
  hold the intercepted traffic; and
  provide the intercepted traffic to the service once a session has been initiated;
authorizing the SPA request;
providing a session ticket to the agent based on the request;
receiving, by a gateway of the deperimeterized access control service, a request to initiate the session with the service, the request including the session ticket;
validating the session ticket; and
providing session parameters to the agent to be used to initiate the session between the electronic device and the service.

2. The computer-implemented method of claim 1, wherein authorizing the SPA request further comprises:
  mapping a user to the electronic device;
  determining a policy associated with the user; and
  generating the session ticket based on the policy.

3. The computer-implemented method of claim 1, wherein the SPA request includes an authorization payload and a credential previously provisioned to the agent.

4. The computer-implemented method of claim 1, wherein the SPA request is unidirectional.

5. The computer-implemented method of claim 1, further comprising:
  receiving, by the gateway of the deperimeterized access control service, a second request to initiate a session with a service, the request not including the session ticket; and
  ignoring the second request.

6. The computer-implemented method of claim 1, further comprising:
  receiving, by the gateway of the deperimeterized access control service, a second request to initiate a session with a service, the request not including the session ticket; and
  routing the second request to a deception environment having a same IP address as the service.

7. The computer-implemented method of claim 6, further comprising:
  identifying a malicious actor based on one or more actions performed in the deception environment; and
  updating the gateway to perform one or more defensive actions on future traffic received from the malicious actor.

8. A system comprising:
  a first one or more electronic devices to implement a service in a multi-tenant provider network; and
  a second one or more electronic devices to implement a deperimeterized access control service in the multi-tenant provider network, the deperimeterized access control service including instructions that upon execution cause the deperimeterized access control service to:
    receive, by a controller of the deperimeterized access control service, a single packet authorization (SPA) request for a session ticket from an agent on a client device, wherein the agent sends the request for the session ticket in response to intercepting traffic destined for a service associated with the deperimeterized access control service and determining that the agent does not have a session ticket for the service, wherein the agent on the electronic device is further configured to:
      obtain posture information for the electronic device, the posture information including one or more of a software version associated with the client device, network security information associated with the client device, device physical location, connected wireless devices, or user biometrics;
      provide the posture information to the controller;
      hold the intercepted traffic; and
      provide the intercepted traffic to the service once a session has been initiated;
    authorize the SPA request;
    provide a session ticket to the agent based on the request;
    receive, by a gateway of the deperimeterized access control service, a request to initiate the session with the service, the request including the session ticket;
    validate the session ticket; and
    provide session parameters to the agent to be used to initiate the session between the client device and the service.

9. The system of claim 8, wherein to authorize the SPA request, the instructions, when executed, further cause the deperimeterized access control service to:
  map a user to the client device;
  determine a policy associated with the user; and
  generate the session ticket based on the policy.

10. The system of claim 9, wherein the SPA request includes an authorization payload and a credential previously provisioned to the agent.

11. The system of claim 8, wherein the SPA request is unidirectional.

12. The system of claim 8, wherein the instructions, when executed, further cause the deperimeterized access control service to:
  receive, by the gateway of the deperimeterized access control service, a second request to initiate a session with the service, the request not including the session ticket; and
  ignore the second request.

13. The system of claim 8, wherein the instructions, when executed, further cause the deperimeterized access control service to:
  receive, by the gateway of the deperimeterized access control service, a second request to initiate a session with the service, the request not including the session ticket; and
  route the second request to a deception environment having a same IP address as the service.

14. A computer-implemented method comprising:
  receiving, by a controller of a deperimeterized access control service, a single packet authorization (SPA) request for a session ticket from an agent on an electronic device, wherein the agent sends the request for the session ticket in response to intercepting traffic destined for a service associated with the deperimeterized access control service and determining that the agent does not have a session ticket for the service;

authorizing the SPA request;

providing a session ticket to the agent based on the request;

receiving, by a gateway of the deperimeterized access control service, a request to initiate a session with the service, the request including the session ticket;

validating the session ticket;

providing session parameters to the agent to be used to initiate the session between the electronic device and the service;

receiving, by the gateway of the deperimeterized access control service, a second request to initiate a second session with the service, the request not including the session ticket; and routing the second request to a deception environment having a same internet protocol (IP) address as the service.

15. The computer-implemented method of claim 14, further comprising:

identifying a malicious actor based on one or more actions performed in the deception environment; and updating the gateway to perform one or more defensive actions on future traffic received from the malicious actor.

16. The computer-implemented method of claim 14, wherein the SPA request includes an authorization payload and a credential previously provisioned to the agent.

17. The computer-implemented method of claim 14, wherein the SPA request is unidirectional.

18. A system comprising:

a first one or more electronic devices to implement a service in a multi-tenant provider network; and a second one or more electronic devices to implement a deperimeterized access control service in the multi-tenant provider network, the deperimeterized access control service including instructions that upon execution cause the deperimeterized access control service to:

receive, by a controller of the deperimeterized access control service, a single packet authorization (SPA) request for a session ticket from an agent on a client device, wherein the agent sends the request for the session ticket in response to intercepting traffic destined for a service associated with the deperimeterized access control service and determining that the agent does not have a session ticket for the service;

authorize the SPA request;

provide a session ticket to the agent based on the request;

receive, by a gateway of the deperimeterized access control service, a request to initiate a session with the service, the request including the session ticket;

validate the session ticket;

provide session parameters to the agent to be used to initiate the session between the client device and the service;

receive, by the gateway of the deperimeterized access control service, a second request to initiate a second session with the service, the request not including the session ticket; and route the second request to a deception environment having a same internet protocol (IP) address as the service.

19. The system of claim 18, wherein the deperimeterized access control service further includes instructions that upon execution cause the deperimeterized access control service to:

identify a malicious actor based on one or more actions performed in the deception environment; and update the gateway to perform one or more defensive actions on future traffic received from the malicious actor.

20. The system of claim 18, wherein the deperimeterized access control service further includes instructions that upon execution cause the deperimeterized access control service to:

receive, by the gateway of the deperimeterized access control service, a third request to initiate a third session with the service, the third request not including the session ticket; and ignore the third request.

* * * * *